United States Patent
Vo et al.

(10) Patent No.: US 10,000,692 B2
(45) Date of Patent: Jun. 19, 2018

(54) FRACTURING OR GRAVEL-PACKING FLUID WITH CMHEC IN BRINE

(71) Applicant: Halliburton Energy Services, Inc., Houston, TX (US)

(72) Inventors: Loan Vo, Houston, TX (US); Tingji Tang, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days. days.

(21) Appl. No.: 14/903,765

(22) PCT Filed: Aug. 9, 2013

(86) PCT No.: PCT/US2013/054258
§ 371 (c)(1),
(2) Date: Jan. 8, 2016

(87) PCT Pub. No.: WO2015/020666
PCT Pub. Date: Feb. 12, 2015

(65) Prior Publication Data
US 2016/0168455 A1    Jun. 16, 2016

(51) Int. Cl.
*C09K 8/90* (2006.01)
*C09K 8/68* (2006.01)
*C08L 1/28* (2006.01)

(52) U.S. Cl.
CPC ....... *C09K 8/90* (2013.01); *C08L 1/28* (2013.01); *C08L 1/284* (2013.01); *C08L 1/286* (2013.01); *C09K 8/68* (2013.01); *C09K 2208/24* (2013.01); *C09K 2208/26* (2013.01)

(58) Field of Classification Search
None
See application file for complete search history.

(56) References Cited

U.S. PATENT DOCUMENTS

| | | | |
|---|---|---|---|
| 3,448,100 A | 6/1969 | Callihan et al. | |
| 3,800,872 A | 4/1974 | Friedman | |
| 4,035,195 A | 7/1977 | Podlas | |
| 4,175,042 A * | 11/1979 | Mondshine | C09K 8/08 166/305.1 |
| 4,239,629 A | 12/1980 | Sauber | |
| 4,321,968 A | 3/1982 | Clear | |
| 4,324,668 A | 4/1982 | Harris | |
| 4,425,241 A | 1/1984 | Swanson | |
| 4,428,432 A * | 1/1984 | Pabley | C09K 8/74 166/307 |
| 4,451,389 A | 5/1984 | Clear | |
| T101,401 I4 | 7/1984 | Majewicz | |
| 4,524,829 A | 6/1985 | Hanlon et al. | |
| 4,552,215 A | 11/1985 | Almond et al. | |
| 4,649,999 A | 3/1987 | Sandy et al. | |
| 5,759,964 A * | 6/1998 | Shuchart | C09K 8/08 507/209 |
| 6,303,544 B1 | 10/2001 | Maas et al. | |
| 6,708,760 B1 | 3/2004 | Chatterji et al. | |
| 6,810,959 B1 * | 11/2004 | Qu | C09K 8/68 166/300 |
| 7,935,660 B2 | 5/2011 | Harris et al. | |
| 2008/0236824 A1 | 10/2008 | Putzig | |

FOREIGN PATENT DOCUMENTS

EP    0104009 B1    10/1986

OTHER PUBLICATIONS

International Search Report and Written Opinion issued in related PCT Application No. PCT/US2013/054258 dated May 20, 2014, 10 pages.
International Preliminary Report on Patentability issued in related PCT Application No. PCT/US2013/054258 dated Feb. 18, 2016 (8 pages).

* cited by examiner

*Primary Examiner* — Jeffrey Washville
(74) *Attorney, Agent, or Firm* — Craig Roddy; Baker Botts L.L.P.

(57) ABSTRACT

A method of treating a treatment zone of a subterranean formation penetrated by a wellbore of a well, the method including the steps of: (A) forming a treatment fluid comprising: (i) an aqueous phase comprising water having at least 1,000 ppm total dissolved inorganic salts; (ii) a carboxymethyl hydroxyethyl cellulose, wherein: (a) the carboxymethyl hydroxyethyl cellulose has a carboxymethyl degree of substitution is in the range of about 0.3 to about 0.45 per glucopyranose unit in the polymer; and (b) the carboxymethyl hydroxyethyl cellulose has a hydroxyethyl molecular substitution is in the range of about 2.1 to about 2.8 per glucopyranose unit in the polymer; and (iii) a breaker for the carboxymethyl hydroxyethyl cellulose; and (B) introducing the treatment fluid into the treatment zone. In embodiments, the carboxymethyl hydroxyethyl cellulose may or may not be crosslinked.

10 Claims, No Drawings

FRACTURING OR GRAVEL-PACKING FLUID WITH CMHEC IN BRINE

CROSS-REFERENCE TO RELATED APPLICATION

The present application is a U.S. National Stage Application of International Application No. PCT/US2013/054258 filed Aug. 9, 2013, which is incorporated herein by reference in its entirety for all purposes.

TECHNICAL FIELD

This disclosure is in the field of producing crude oil or natural gas from subterranean formations. More specifically, the disclosure generally relates to fluids and methods of fracturing a treatment zone of a subterranean formation penetrated by a wellbore of a well.

BACKGROUND

The demand for fresh water for oilfield operations has skyrocketed as a result of the boom in hydraulic fracturing for shale plays. A typical hydraulic fracturing treatment may consume, on average, three to five million gallons of water (usually freshwater). This is particularly problematic offshore, where freshwater must be transported to the well site, whereas seawater is readily available, if it could be used to formulate a good fracturing fluid.

For additional reasons it is often desirable to form and use a fracturing fluid having a high content of inorganic salt, whether on land or offshore. For example, salt curbs bacterial action. Salt provides weight (that is, density) to a treatment fluid. Salt (e.g. KCl) usually reduces damage to production sands containing swellable clay.

Not many polymers perform well in brine, however, and even fewer perform well in hard brine such as seawater, which include a high concentration of divalent metal ions such as magnesium and calcium.

GENERAL DESCRIPTION OF EMBODIMENTS

Carboxymethylhydroxyethyl cellulose ("CMHEC") is a cellulose derivative having two different substituents bound onto some of the hydroxy groups of the glucopyranose monomers that make up the cellulose backbone: one is the carboxymethyl ("CM") group, and the other is the hydroxyethyl ("HE") group.

Use of CMHEC in fracturing fluids has offered many advantages over traditional guar-based frac fluids. For example, CMHEC, as it compares to a traditional guar-based fluid, provides superior cleanliness and reduced cost. Most commercially available guar has between 3% and 10% by weight insoluble residue, whereas CMHEC has less than 1% by weight insoluble residue, that is, polymeric material that does not fully hydrate. CMHEC provides improved cleanup and enhanced proppant pack, sand pack, or core regained permeability, which ultimately leads to enhanced oil or gas production from stimulation treatments. Another property that makes CMHEC a great candidate for use in treatments fluids for fracturing or frac-packing is that CMHEC has shown to provide greater proppant or gravel suspension as compared to guar-based fluids or viscoelastic (VES) fluids.

In comparison to fracturing fluids that utilize carboxymethyl cellulose ("CMC"), which also offer the above advantages of cleanliness, CMHEC-based fluids offer enhanced performance and provide superior salt tolerance. Thus, these fluids have potential for use with alternative sources of water.

CMHEC-based fluid systems can be used in brackish water, seawater, or brine, even hard brine; however, the particular CMHEC should be selected for use in hard brine. These systems can be especially suitable for offshore applications using seawater as well as those onshore involving anything from pond to sewage to recycled flowback or produced waters, which often have dissolved salts. This disclosure can decrease the demand of fresh water required for fracturing applications while providing a clean and reliable fracturing fluid.

The carboxy-substituted cellulose ethers, such as CMHEC and CMC, are usually commercially available as the alkali metal salt, usually the sodium salt. However, the metal is seldom referred to and they are commonly referred to as CMC, CMHEC. Unless otherwise stated, it should be understood that these are typically obtained as the alkali metal salt. Of course, the carboxylate form (alkali metal salt) can be easily converted to the carboxylic acid form depending on the pH of an aqueous phase in which the polymeric material is dispersed or dissolved.

The molecular structure of carboxymethyl hydroxyethyl cellulose is related to its performance in a hydraulic fracturing fluid. Understanding the biopolymer at its molecular level not only helps explain the current rheological properties of a CMHEC fluid but also allow chemists to tailor the chemistry of the polymer to deliver specific performances for specific applications.

It is believed that on which hydroxyl groups the CM or HE groups are substituted and how many of these substituents per glucopyranose monomer unit are critical to the polymer's physical and chemical properties and the rheological properties of a CMHEC-based fluid.

The terms "DS" and "MS" are abbreviations for "degree of substitution" and "molar substitution," respectively. Three hydroxyl groups are in each anhydroglucose unit in the cellulose molecule. DS is the average number of hydroxyl groups substituted in the cellulose per anhydroglucose unit. Thus, the DS of a cellulose derivative can be no higher than 3. MS is the average number of moles of reactant combined with the cellulose per anhydroglucose unit. For the alkyl, carboxyalkyl, or acyl derivatives of cellulose, the DS and the MS are the same. For the hydroxyalkyl derivatives of cellulose, the MS is generally greater than the DS. The reason for this is that each time a hydroxyalkyl group is reacted with the cellulose molecule, an additional hydroxyl group is formed which itself is capable of hydroxyalkylation. As a result of this, side chains of considerable length may form on the cellulose molecule. The MS/DS ratio represents the average length of these side chains. See, for example, *Polymer Modification: Principles, Techniques, and Applications*, edited by John J. Meister, CRC Press, 2000, pages 49-52.

In general, the carboxymethyl DS of the CMHEC can be in a broad range of about 0.1 to about 1.0 and the hydroxyethyl MS can be in the range of about 0.1 to about 3. However, examples of hydration of several aqueous CMHEC-based fluid wherein the CMHEC has varying degrees of CM-DS and HE-MS substitutions leads to several critical conclusion about the relationship of the chemistry of the polymer at the molecular level and its performance as a fracturing fluid as well as its tolerance in an ionic solution, especially a hard brine such as seawater: (A) CMHEC with carboxymethyl degree of substitution (CM-DS) between about 0.3 to about 0.45 per glucopyranose unit in polymer provides good salt tolerance even in a hard brine such as seawater and also provides good cross-linking efficiency; and (B) CMHEC with hydroxyethyl molecular substitution (HE-MS) between about 2.1 to about 2.8 per glucopyranose unit in polymer provides good salt tolerance even in a hard brine such as seawater. The presence of hydroxyethyle groups along the side chains will help to improve the hydration kinetics of CMHEC in water thus decrease the hydration time. The hydrophobicity of the hydroxylethyl groups will also improve the thermal stability of gels and thus could be applied in wells with higher BHST. In addition, it is believed that random CM-DS is better than block CM substitution. The CMHEC examples were obtained from a commercial supplier, which products are conventionally used for hair conditioner or in the food industry.

For example, the concentration of gel balls of the polymer that remained unhydrated in seawater decreases as the HE-MS increases. Without necessarily being limited by any theory, it is further believed that within this HE-MS range, the higher the molecular substitution of hydroxyethyl group, the more the polymer strand untangled, minimizing crystalline segment and blockness in the polymer, leading to easier hydration and minimizing unhydrated gel balls.

The CMHEC-based fluid: is a clean, non-damaging, less expensive alternative to a guar-based fluid; has greater salt tolerance than other "clean" fluid systems (such as CMC-based fluids); and is robust, versatile, and has potential to work in a variety of water types.

A method of treating a treatment zone of a subterranean formation penetrated by a wellbore of a well is provided, the method including: (A) forming a treatment fluid comprising: (i) an aqueous phase comprising water having at least 1,000 ppm total dissolved inorganic salts; (ii) a carboxymethyl hydroxyethyl cellulose, wherein: (a) the carboxymethyl hydroxyethyl cellulose has a carboxymethyl degree of substitution is in the range of about 0.3 to about 0.45 per glucopyranose unit in the polymer; and (b) the carboxymethyl hydroxyethyl cellulose has a hydroxyethyl molecular substitution is in the range of about 2.1 to about 2.8 per glucopyranose unit in the polymer; and (iii) a breaker for the carboxymethyl hydroxyethyl cellulose; and (B) introducing the treatment fluid into the treatment zone.

In an embodiment, the treatment fluid is substantially free of any crosslinker for the carboxymethyl hydroxyethyl cellulose. Such an embodiment of the CMHEC in a brine as a non-crosslinked fluid (sometimes referred to as a "linear gel") can be used, for example, as a pad fluid as part of a method of hydraulic fracturing in a treatment zone. As used herein, "substantially free" means having less of any crosslinker that would be effective to increase the viscosity of the fluid by more than 10% relative to an otherwise same CMHEC-based fluid that is completely non-crosslinked. In such an embodiment, the treatment fluid is preferably essentially free of any crosslinker for the carboxymethyl hydroxyethyl cellulose. As used herein, "essentially free" means having less of any crosslinker that would be effective to increase the viscosity of the fluid by more than 5% relative to an otherwise same CMHEC-based fluid that is completely non-crosslinked. More preferably, in such an embodiment, the treatment fluid is completely free of any crosslinker for the carboxymethyl hydroxyethyl cellulose. In such an embodiment, the aqueous phase preferably has an initial pH greater than about 5. More preferably, the aqueous phase has a pH in the range of about 5 to about 9. Most preferably, the aqueous phase has an initial pH in the rate of about 6 to about 8.

In another embodiment, the treatment fluid includes a crosslinker for the carboxymethyl hydroxyethyl cellulose, wherein the crosslinker comprises a polyvalent cation. As used herein, "polyvalent" means having a valence state of 3 or greater. In such an embodiment, the polyvalent cation is preferably chelated. Preferably, the polyvalent cation is selected from the group consisting of aluminum, zirconium, titanium, and any combination thereof. In such an embodiment, the aqueous phase preferably has an initial pH greater than about 5. More preferably, the aqueous phase has a pH in the range of about 5 to about 6.5. For a crosslinked fracturing fluid or gravel-packing fluid, it is desirable for the treatment fluid to crosslink within a matter of minutes of forming the treatment fluid, for example, in less than about 10 minutes.

These and other embodiments of the disclosure will be apparent to one skilled in the art upon reading the following detailed description. While the disclosure is susceptible to various modifications and alternative forms, specific embodiments thereof will be described in detail and shown by way of example. It should be understood, however, that it is not intended to limit the disclosure to the particular forms disclosed.

DETAILED DESCRIPTION OF PRESENTLY PREFERRED EMBODIMENTS AND BEST MODE

Definitions and Usages

General Interpretation

The words or terms used herein have their plain, ordinary meaning in the field of this disclosure, except to the extent explicitly and clearly defined in this disclosure or unless the specific context otherwise requires a different meaning.

The words "comprising," "containing," "including," "having," and all grammatical variations thereof are intended to have an open, non-limiting meaning. For example, a composition comprising a component does not exclude it from having additional components, an apparatus comprising a part does not exclude it from having additional parts, and a method having a step does not exclude it having additional steps. When such terms are used, the compositions, apparatuses, and methods that "consist essentially of" or "consist of" the specified components, parts, and steps are specifically included and disclosed. As used herein, the words "consisting essentially of," and all grammatical variations thereof are intended to limit the scope of a claim to the specified materials or steps and those that do not materially affect the basic and novel characteristic(s) of the claimed invention.

The indefinite articles "a" or "an" mean one or more than one of the component, part, or step that the article introduces.

Whenever a numerical range of degree or measurement with a lower limit and an upper limit is disclosed, any number and any range falling within the range is also intended to be specifically disclosed. For example, every range of values (in the form "from a to b," or "from about a to about b," or "from about a to b," "from approximately a to b," and any similar expressions, where "a" and "b" represent numerical values of degree or measurement) is to be understood to set forth every number and range encompassed within the broader range of values.

Oil and Gas Reservoirs

In the context of production from a well, "oil" and "gas" are understood to refer to crude oil and natural gas, respectively. Oil and gas are naturally occurring hydrocarbons in certain subterranean formations.

A "subterranean formation" is a body of rock that has sufficiently distinctive characteristics and is sufficiently continuous for geologists to describe, map, and name it.

A subterranean formation having a sufficient porosity and permeability to store and transmit fluids is sometimes referred to as a "reservoir."

A subterranean formation containing oil or gas may be located under land or under the seabed off shore. Oil and gas reservoirs are typically located in the range of a few hundred feet (shallow reservoirs) to a few tens of thousands of feet (ultra-deep reservoirs or source rocks such as shale formation) below the surface of the land or seabed.

Well Servicing

To produce oil or gas from a reservoir, a wellbore is drilled into a subterranean formation, which may be the reservoir or adjacent to the reservoir.

Generally, well services include a wide variety of operations that may be performed in oil, gas, geothermal, or water wells, such as drilling, cementing, completion, and intervention. Well services are designed to facilitate or enhance the production of desirable fluids such as oil or gas from or through a subterranean formation. A well service usually involves introducing a fluid into a well.

Drilling, completion, and intervention operations can include various types of treatments that are commonly performed on a well or subterranean formation. During completion or intervention, stimulation is a type of treatment performed to enhance or restore the productivity of oil and gas from a well. Stimulation treatments fall into two main groups: hydraulic fracturing and matrix treatments. Fracturing treatments are performed above the fracture pressure of the subterranean formation to create or extend a highly permeable flow path between the formation and the wellbore. Matrix treatments are performed below the fracture pressure of the formation. Other types of completion or intervention treatments can include, for example, gravel packing, consolidation, and controlling excessive water production.

Wells and Fluids

A "well" includes a wellhead and at least one wellbore from the wellhead penetrating the earth. The "wellhead" is the surface termination of a wellbore, which surface may be on land or on a seabed.

A "well site" is the geographical location of a wellhead of a well. It may include related facilities, such as a tank battery, separators, compressor stations, heating or other equipment, and fluid pits. If offshore, a well site can include a platform.

The "wellbore" refers to the drilled hole, including any cased or uncased portions of the well or any other tubulars in the well. A wellbore can have portions that are vertical, horizontal, or anything in between, and it can have portions that are straight, curved, or branched. As used herein, "uphole," "downhole," and similar terms are relative to the direction of the wellhead, regardless of whether a wellbore portion is vertical or horizontal.

A wellbore can be used as a production or injection wellbore. A production wellbore is used to produce hydrocarbons from the reservoir. An injection wellbore is used to inject a fluid, for example, liquid water or steam, to drive oil or gas to a production wellbore.

As used herein, introducing "into a well" means introducing at least into and through the wellhead. According to various techniques known in the art, tubulars, equipment, tools, or fluids can be directed from the wellhead into any desired portion of the wellbore.

As used herein, the word "tubular" means any kind of structural body in the general form of a tube. Examples of tubulars in oil wells include, but are not limited to, a drill pipe, a casing, a tubing string, a coil tubing, a line pipe, and a transportation pipe.

As used herein, unless the context otherwise requires, a treatment fluid refers to the specific properties and composition of a fluid at the time the fluid is being introduced into a well. In addition, it should be understood that, during the course of a well operation such as drilling, cementing, completion, or intervention, or during a specific treatment, the specific properties and composition of a type of fluid can be varied or several different types of fluids can be used.

For example, the compositions can be varied to adjust viscosity or elasticity of the fluids to accommodate changes in the concentrations of particulate to be carried downhole. It can also be desirable to accommodate expected changes in temperatures encountered by the fluids during the course of the treatment. By way of another example, it can be desirable to accommodate the longer duration that an earlier-introduced treatment fluid may need to maintain viscosity before breaking compared to the shorter duration that a later-introduced treatment fluid may need to maintain viscosity before breaking. Changes in concentration of a particulate, viscosity-increasing agent, breaker, or other additives in the various treatment fluids of a treatment operation can be made in stepped changes of concentrations or ramped changes of concentrations.

As used herein, the word "treatment" refers to any treatment for changing a condition of a portion of a wellbore or a subterranean formation adjacent a wellbore; however, the word "treatment" does not necessarily imply any particular treatment purpose. A treatment usually involves introducing a fluid for the treatment, in which case it may be referred to as a treatment fluid, into a well. As used herein, a "treatment fluid" is a fluid used in a treatment. The word "treatment" in the term "treatment fluid" does not necessarily imply any particular treatment or action by the fluid.

In the context of a well or wellbore, a "portion" or "interval" refers to any downhole portion or interval along the length of a wellbore.

A "zone" refers to an interval of rock along a wellbore that is differentiated from uphole and downhole zones based on hydrocarbon content or other features, such as permeability, composition, perforations, or other fluid communication with the wellbore, faults, or fractures. A zone of a wellbore that penetrates a hydrocarbon-bearing zone that is capable of producing hydrocarbon is referred to as a "production zone."
A "treatment zone" refers to an interval of rock along a wellbore into which a fluid is directed to flow from the wellbore. As used herein, "into a treatment zone" means into and through the wellhead and, additionally, through the wellbore and into the treatment zone.

A "design" refers to the estimate or measure of one or more parameters planned or expected for a particular fluid or stage of a well service or treatment. For example, a fluid can be designed to have components that provide a minimum density or viscosity for at least a specified time under expected downhole conditions. A well service may include design parameters such as fluid volume to be pumped, required pumping time for a treatment, or the shear conditions of the pumping.

The term "design temperature" refers to an estimate or measurement of the actual temperature at the downhole environment during the time of a treatment. For example, the design temperature for a well treatment takes into account not only the bottom hole static temperature ("BHST"), but also the effect of the temperature of the fluid on the BHST during treatment. The design temperature for a fluid is sometimes referred to as the bottom hole circulation temperature ("BHCT"). Because fluids may be considerably cooler than BHST, the difference between the two temperatures can be quite large. Ultimately, if left undisturbed a subterranean formation will return to the BHST.

Particles and Particulates

As used herein, a "particle" refers to a body having a finite mass and sufficient cohesion such that it can be considered as an entity but having relatively small dimensions. A particle can be of any size ranging from molecular scale to macroscopic, depending on context.

As used herein, particulate or particulate material refers to matter in the physical form of distinct particles in a solid or liquid state (which means such an association of a few atoms or molecules). As used herein, a particulate is a grouping of particles having similar chemical composition and particle size ranges anywhere in the range of about 0.5 micrometer (500 nm), for example, microscopic clay particles, to about 3 millimeters, for example, large grains of sand.

A particulate can be of solid or liquid particles. As used herein, however, unless the context otherwise requires, particulate refers to a solid particulate.

It should be understood that the terms "particle" and "particulate," includes all known shapes of particles including substantially rounded, spherical, oblong, ellipsoid, rod-like, fiber, polyhedral (such as cubic materials), etc., and mixtures thereof. For example, the term "particulate" as used herein is intended to include solid particles having the physical shape of platelets, shavings, flakes, ribbons, rods, strips, spheroids, toroids, pellets, tablets or any other physical shape.

As used herein, a fiber is a particle or grouping of particles having an aspect ratio L/D greater than 5/1.

A particulate will have a particle size distribution ("PSD"). As used herein, "the size" of a particulate can be determined by methods known to persons skilled in the art.

One way to measure the approximate particle size distribution of a solid particulate is with graded screens. A solid particulate material will pass through some specific mesh (that is, have a maximum size; larger pieces will not fit through this mesh) but will be retained by some specific tighter mesh (that is, a minimum size; pieces smaller than this will pass through the mesh). This type of description establishes a range of particle sizes. A "+" before the mesh size indicates the particles are retained by the sieve, while a "−" before the mesh size indicates the particles pass through the sieve. For example, −70/+140 means that 90% or more of the particles will have mesh sizes between the two values.

Particulate materials are sometimes described by a single mesh size, for example, 100 U.S. Standard mesh. If not otherwise stated, a reference to a single particle size means about the mid-point of the industry-accepted mesh size range for the particulate.

Dispersions and Solutions

A dispersion is a system in which particles of a substance of one chemical composition and physical state are dispersed in another substance of a different chemical composition or physical state. In addition, phases can be nested. If a substance has more than one phase, the most external phase is referred to as the continuous phase of the substance as a whole, regardless of the number of different internal phases or nested phases.

A dispersion can be classified in different ways, including, for example, based on the size of the dispersed particles, the uniformity or lack of uniformity of the dispersion, and, if a fluid, by whether or not precipitation occurs.

A dispersion is considered to be heterogeneous if the dispersed particles are not dissolved and are greater than about 1 nanometer in size. (For reference, the diameter of a molecule of toluene is about 1 nm and a molecule of water is about 0.3 nm).

Heterogeneous dispersions can have gas, liquid, or solid as an external phase. For example, in a case where the dispersed-phase particles are liquid in an external phase that is another liquid, this kind of heterogeneous dispersion is more particularly referred to as an emulsion. A solid dispersed phase in a continuous liquid phase is referred to as a sol, suspension, or slurry, partly depending on the size of the dispersed solid particulate.

A dispersion is considered to be homogeneous if the dispersed particles are dissolved in solution or the particles are less than about 1 nanometer in size. Even if not dissolved, a dispersion is considered to be homogeneous if the dispersed particles are less than about 1 nanometer in size.

A solution is a special type of homogeneous mixture. A solution is considered homogeneous: (a) because the ratio of solute to solvent is the same throughout the solution; and (b) because solute will never settle out of solution, even under powerful centrifugation, which is due to intermolecular attraction between the solvent and the solute. An aqueous solution, for example, saltwater, is a homogenous solution in which water is the solvent and salt is the solute.

Hydratability or Solubility

As referred to herein, "hydratable" means capable of being hydrated by contacting the hydratable material with water. Regarding a hydratable material that includes a polymer, this means, among other things, to associate sites on the polymer with water molecules and to unravel and extend the polymer chain in the water.

The term "solution" is intended to include not only true molecular solutions but also dispersions of a polymer wherein the polymer is so highly hydrated as to cause the dispersion to be visually clear and having essentially no particulate matter visible to the unaided eye. The term "soluble" is intended to have a meaning consistent with these meanings of solution.

A substance is considered to be "soluble" in a liquid if at least 10 grams of the substance can be hydrated or dissolved in one liter of the liquid when tested at 77° F. and 1 atmosphere pressure for 2 hours, considered to be "insoluble" if less than 1 gram per liter, and considered to be "sparingly soluble" for intermediate solubility values.

As will be appreciated by a person of skill in the art, the hydratability, dispersibility, or solubility of a substance in water can be dependent on the salinity, pH, or other substances in the water. Accordingly, the salinity, pH, and additive selection of the water can be modified to facilitate the hydratability, dispersibility, or solubility of a substance in aqueous solution. To the extent not specified, the hydratability, dispersibility, or solubility of a substance in water is determined in deionized water, at neutral pH, and without any other additives.

As used herein, "salt tolerance" of a polymeric material means it hydrates well in the presence of dissolved salts to provide viscosity, for example, in 2% KCl or in presence of divalent ions, for example, in synthetic seawater.

The "source" of a chemical species in a solution or in a fluid composition can be a material or substance that is itself the chemical species, or that makes the chemical species chemically available immediately, or it can be a material or substance that gradually or later releases the chemical species to become chemically available in the solution or the fluid.

Fluids

A fluid can be a homogeneous or heterogeneous. In general, a fluid is an amorphous substance that is or has a continuous phase of particles that are smaller than about 1 micrometer that tends to flow and to conform to the outline of its container.

Every fluid inherently has at least a continuous phase. A fluid can have more than one phase. The continuous phase of a treatment fluid is a liquid under Standard Laboratory Conditions.

The term "water" is used generally herein to include fresh water or brine, unless the context otherwise requires.

As used herein, the term "brine" is intended to include, unless the context otherwise requires, any aqueous solution having greater than 1,000 ppm total dissolved inorganic salts. Oil field brines commonly contain varying concentrations of inorganic salts, e.g., sodium chloride, calcium chloride, and magnesium salts. Aqueous solutions are frequently modified by addition of potassium chloride to stabilize the subsurface clay. Accordingly, potassium chloride is frequently encountered in brines.

As used herein, the term "hard brine" is intended to include, unless the context otherwise requires, any aqueous solution having greater than 1,000 ppm total dissolved divalent inorganic salts, such as magnesium or calcium. For example, a hard brine can have about 1,000 ppm to about 16,000 ppm divalent cations such calcium ions.

As used herein, a "water-based" fluid means that water or an aqueous solution is the dominant material of the continuous phase, that is, greater than 50% by weight, of the continuous phase of the fluid based on the combined weight of water and any other solvents in the phase (that is, excluding the weight of any dissolved solids).

In contrast, an "oil-based" fluid means that oil is the dominant material by weight of the continuous phase of the fluid. In this context, the oil of an oil-based fluid can be any oil.

Gels and Deformation

Technically, a "gel" is a semi-solid, jelly-like physical state or phase that can have properties ranging from soft and weak to hard and tough. Shearing stresses below a certain finite value fail to produce permanent deformation. The minimum shear stress which will produce permanent deformation is referred to as the shear strength or gel strength of the gel.

The physical state of a gel is formed by a network of interconnected molecules, such as a crosslinked polymer or a network of micelles in a continuous liquid phase. The network gives a gel phase its structure and an apparent yield point. At the molecular level, a gel is a dispersion in which both the network of molecules is continuous and the liquid is continuous. A gel is sometimes considered as a single phase.

A hydrogel is a gel state having a network of polymer chains that are hydrophilic and for which water is the dispersion medium. In some cases, a "hydrogel" refers to a natural or synthetic polymeric material that is a highly absorbent and that can form such a gel.

In the oil and gas industry, however, the term "gel" may be used to refer to any fluid having a viscosity-increasing agent, regardless of whether it is a viscous fluid or meets the technical definition for the physical state of a gel. A "base gel" is a term used in the field for a fluid that includes a viscosity-increasing agent, such as guar or other polymer, but that excludes crosslinking agents. Typically, a base gel is mixed with another fluid containing a crosslinker, wherein the mixture is adapted to form a crosslinked gel. Similarly, a "crosslinked gel" may refer to a substance having a viscosity-increasing agent that is crosslinked, regardless of whether it is a viscous fluid or meets the technical definition for the physical state of a gel.

As used herein, a substance referred to as a "gel" is subsumed by the concept of "fluid" if it is a pumpable fluid.

Viscosity Measurements (For Example, for Hydraulic Fracturing or Gravel Packing)

There are numerous ways of measuring and modeling viscous properties, and new developments continue to be made. The methods depend on the type of fluid for which viscosity is being measured. A typical method for quality assurance or quality control (QA/QC) purposes uses a couette device, such as a FANN™ Model 35 or Model 50 viscometer or a CHANDLER™ Model 5550 HPHT viscometer. Such a viscometer measures viscosity as a function of time, temperature, and shear rate. The viscosity-measuring instrument can be calibrated using standard viscosity silicone oils or other standard viscosity fluids.

A substance is considered to be a fluid if it has an apparent viscosity less than 5,000 mPa·s (cP) (independent of any gel characteristic). For reference, the viscosity of pure water is about 1 mPa·s (cP).

As used herein, for the purposes of hydraulic fracturing a fluid is considered to be "viscous" if it has an apparent viscosity of 200 mPa·s (cP) at 40 $s^{-1}$ shear rate or higher. The viscosity of a viscous fluid is considered to break or be broken if the viscosity is greatly reduced. Preferably, although not necessarily for all applications depending on how high the initial viscosity of the fluid, the viscous fluid breaks to a viscosity of less than 50% of the viscosity of the maximum viscosity or less than 200 mPa·s (cP) at 40 $s^{-1}$ shear rate.

General Measurement Terms

Unless otherwise specified or unless the context otherwise clearly requires, any ratio or percentage means by weight.

Unless otherwise specified or unless the context otherwise clearly requires, the phrase "by weight of the water" means the weight of the water of an aqueous phase of the fluid without the weight of any viscosity-increasing agent, dissolved salt, suspended particulate, or other materials or additives that may be present in the water.

If there is any difference between U.S. or Imperial units, U.S. units are intended. For example, "GPT" or "gal/Mgal" means U.S. gallons per thousand U.S. gallons and "ppt" means pounds per thousand U.S. gallons.

The barrel ("bbl") is the unit of measure used in the US oil industry, wherein one barrel equals 42 U.S. gallons. Standards bodies such as the American Petroleum Institute (API) have adopted the convention that if oil is measured in oil barrels, it will be at 14.696 psi and 60° F., whereas if it is measured in cubic meters, it will be at 101.325 kPa and 15° C. (or in some cases 20° C.). The pressures are the same but the temperatures are different—60° F. is 15.56° C., 15° C. is 59° F., and 20° C. is 68° F. However, if all that is needed is to convert a volume in barrels to a volume in cubic meters without compensating for temperature differences, then 1 bbl equals 0.159 $m^3$ or 42 U.S. gallons.

Unless otherwise specified, mesh sizes are in U.S. Standard Mesh.

The micrometer (μm) may sometimes be referred to herein as a micron.

The conversion between pound per gallon (lb/gal or ppg) and kilogram per cubic meter (kg/m$^3$) is: 1 lb/gal=(0.4536 kg/lb)×(gal/0.003785 m$^3$)=120 kg/m$^3$.

The conversion between pound per thousand gallons (lb/Mgal) and kilogram per cubic meter (kg/m$^3$) is: 1 lb/Mgal=(0.4536 kg/lb)×(Mgal/3.785 m$^3$)=0.12 kg/m$^3$.

The conversion between pound per barrel (lb/bbl) and kilogram per cubic meter (kg/m$^3$) is: 1 lb/bbl=(0.4536 kg/lb)×(bbl/0.159 m$^3$)=2.85 kg/m$^3$.

Hydraulic Fracturing

The purpose of a hydraulic fracturing treatment is to provide an improved flow path for oil or gas to flow from a hydrocarbon-bearing formation to the wellbore. In addition, a fracturing treatment can facilitate the flow of injected treatment fluids from the well into the formation. A treatment fluid adapted for this purpose is sometimes referred to as a fracturing fluid. The fracturing fluid is pumped at a sufficiently high flow rate and pressure into the wellbore and into the subterranean formation to create or enhance one or more fractures in the subterranean formation. Creating a fracture means making a new fracture in the formation. Enhancing a fracture means enlarging a pre-existing fracture in the formation.

A frac pump is used for hydraulic fracturing. A frac pump is a high-pressure, high-volume pump. The fracturing fluid may be pumped down into the wellbore at high rates and pressures, for example, at a flow rate in excess of 50 barrels per minute (2,100 U.S. gallons per minute) at a pressure in excess of 5,000 pounds per square inch ("psi"). The pump rate and pressure of the fracturing fluid may be even higher, for example, flow rates in excess of 100 barrels per minute and pressures in excess of 10,000 psi are often encountered.

Fracturing a subterranean formation often uses hundreds of thousands of gallons of fracturing fluid or more. Further, it is often desirable to fracture more than one treatment zone of a well. Therefore, a high volume of fracturing fluids is often used in fracturing of a well, which means that a low-cost fracturing fluid is desirable. Because of the ready availability and relative low cost of water compared to other liquids, among other considerations, a fracturing fluid is usually water-based.

The creation or extension of a fracture in hydraulic fracturing may initially occur suddenly. When this happens, the fracturing fluid suddenly has a fluid flow path through the fracture to flow more rapidly away from the wellbore. As soon as the fracture is created or enhanced, the sudden increase in the flow of fluid away from the well reduces the pressure in the well. Thus, the creation or enhancement of a fracture in the formation may be indicated by a sudden drop in fluid pressure, which can be observed at the wellhead. After initially breaking down the formation, the fracture may then propagate more slowly, at the same pressure or with little pressure increase. It can also be detected with seismic techniques.

A newly-created or newly-extended fracture will tend to close together after the pumping of the fracturing fluid is stopped. To prevent the fracture from closing, a material is usually placed in the fracture to keep the fracture propped open and to provide higher fluid conductivity than the matrix of the formation. A material used for this purpose is referred to as a proppant.

A proppant is in the form of a solid particulate, which can be suspended in the fracturing fluid, carried downhole, and deposited in the fracture to form a proppant pack. The proppant pack props the fracture in an open condition while allowing fluid flow through the permeability of the pack. The proppant pack in the fracture provides a higher-permeability flow path for the oil or gas to reach the wellbore compared to the permeability of the matrix of the surrounding subterranean formation. This higher-permeability flow path increases oil and gas production from the subterranean formation.

A particulate for use as a proppant is usually selected based on the characteristics of size range, crush strength, and solid stability in the types of fluids that are encountered or used in wells. Preferably, a proppant should not melt, dissolve, or otherwise degrade from the solid state under the downhole conditions.

The proppant is selected to be an appropriate size to prop open the fracture and bridge the fracture width expected to be created by the fracturing conditions and the fracturing fluid. If the proppant is too large, it will not easily pass into a fracture and will screenout too early. If the proppant is too small, it will not provide the fluid conductivity to enhance production. See, for example, W. J. McGuire and V. J. Sikora, "The Effect of Vertical Fractures on Well Productivity," *Trans.*, AIME (1960) 219, 401-403. In the case of fracturing relatively permeable or even tight-gas reservoirs, a proppant pack should provide higher permeability than the matrix of the formation. In the case of fracturing ultra-low permeable formations, such as shale formations, a proppant pack should provide for higher permeability than the naturally occurring fractures or other micro-fractures of the fracture complexity.

Appropriate sizes of particulate for use as a proppant are typically in the range from about 8 to about 100 U.S. Standard Mesh. A typical proppant is sand-sized, which geologically is defined as having a largest dimension ranging from about 0.06 millimeters up to about 2 millimeters (mm) (The next smaller particle size class below sand size is silt, which is defined as having a largest dimension ranging from less than about 0.06 mm down to about 0.004 mm.) As used herein, proppant does not mean or refer to suspended solids, silt, fines, or other types of insoluble solid particulate smaller than about 0.06 mm (about 230 U.S. Standard Mesh). Further, it does not mean or refer to particulates larger than about 3 mm (about 7 U.S. Standard Mesh).

The proppant is sufficiently strong, that is, has a sufficient compressive or crush resistance, to prop the fracture open without being deformed or crushed by the closure stress of the fracture in the subterranean formation. For example, for a proppant material that crushes under closure stress, a 20/40 mesh proppant preferably has an API crush strength of at least 4,000 psi closure stress based on 10% crush fines according to procedure API RP-56. A 12/20 mesh proppant material preferably has an API crush strength of at least 4,000 psi closure stress based on 16% crush fines according to procedure API RP-56. This performance is that of a medium crush-strength proppant, whereas a very high crush-strength proppant would have a crush-strength of about 10,000 psi. In comparison, for example, a 100-mesh proppant material for use in an ultra-low permeable formation such as shale preferably has an API crush strength of at least 5,000 psi closure stress based on 6% crush fines. The higher the closing pressure of the formation of the fracturing application, the higher the strength of proppant is needed. The closure stress depends on a number of factors known in the art, including the depth of the formation.

Further, a suitable proppant should be stable over time and not dissolve in fluids commonly encountered in a well environment. Preferably, a proppant material is selected that will not dissolve in water or crude oil.

Suitable proppant materials include, but are not limited to, silica sand, ground nut shells, ground fruit pits, sintered bauxite, glass, plastics, ceramic materials, processed wood, composite materials, resin coated particulates, and any combination of the foregoing. Mixtures of different kinds or sizes of proppant can be used as well.

In conventional reservoirs, a proppant commonly has a median size anywhere within the range of about 20 to about 100 U.S. Standard Mesh. For a synthetic proppant, it commonly has a median size anywhere within the range of about 8 to about 100 U.S. Standard Mesh.

The concentration of proppant in the treatment fluid depends on the nature of the subterranean formation. As the nature of subterranean formations differs widely, the concentration of proppant in the treatment fluid may be in the range of from about 0.03 kilograms to about 12 kilograms of proppant per liter of liquid phase (from about 0.1 lb/gal to about 25 lb/gal).

A resinous material can be coated on the proppant. Purposes of the coating can include improving the strength of a proppant, changing a wettability characteristic of the proppant for improving flow of oil or gas, or reducing the migration of a particulate in the formation that is smaller than the proppant, which can plug pores in the formation or proppant pack, decrease production, or cause abrasive damage to wellbore pumps, tubing, and other equipment.

The term "coated" does not imply any particular degree of coverage on the proppant particulates, which coverage can be partial or complete.

As used herein, the term "resinous material" means a material that is a viscous liquid and has a sticky or tacky characteristic when tested under Standard Laboratory Conditions. A resinous material can include a resin, a tackifying agent, and any combination thereof in any proportion. The resin can be or include a curable resin.

For example, some or all of the proppant can be coated with a curable resin. The curable resin can be allowed to cure on the proppant prior to the proppant being introduced into the well. The cured resin coating on the proppant provides a protective shell encapsulating the proppant and keeping the fine particulates in place if the proppant was crushed or provides a different wettable surface than the proppant without the coating.

A curable resin coating on the proppant can be allowed to cure after the proppant is placed in the subterranean formation for the purpose of consolidating the proppant of a proppant pack to form a "proppant matrix." As used herein, "proppant matrix" means a closely associated group of proppant particles as a coherent mass of proppant. Typically, a cured resin consolidates the proppant pack into a hardened, permeable, coherent mass. After curing, the resin reinforces the strength of the proppant pack and reduces the flow back of proppant from the proppant pack relative to a similar proppant pack without such a cured resin coating.

A resin or curable resin can be selected from natural resins, synthetic resins, and any combination thereof in any proportion. Natural resins include, but are not limited to, shellac. Synthetic resins include, but are not limited to, epoxies, furans, phenolics, and furfuryl alcohols, and any combination thereof in any proportion. An example of a suitable commercially available resin is the EXPEDITE™ product sold by Halliburton Energy Services, Inc. of Duncan, Okla.

By way of another example, some or all of the proppant can be coated with a tackifying agent, instead of, or in addition to, a curable resin. The tackifying agent acts to consolidate and help hold together the proppant of a proppant pack to form a proppant matrix. Such a proppant matrix can be flexible rather than hard. The tackifying-agent-coated proppant in the subterranean formation tends to cause small particulates, such as fines, to stick to the outside of the proppant. This helps prevent the fines from flowing with a fluid, which could potentially clog the openings to pores.

Tackifying agents include, but are not limited to, polyamides, polyesters, polyethers and polycarbamates, polycarbonates, and any combination thereof in any proportion. An example of a suitable commercially available tackifying agent is the SANDWEDGE™ product sold by Halliburton Energy Services, Inc. of Duncan, Okla.

Sand Control and Gravel Packing

Gravel packing is commonly used as a sand-control method to prevent production of formation sand or other fines from a poorly consolidated subterranean formation. In this context, "fines" are tiny particles, typically having a diameter of 43 microns or smaller, that have a tendency to flow through the formation with the production of hydrocarbon. The fines have a tendency to plug small pore spaces in the formation and block the flow of oil. As all the hydrocarbon is flowing from a relatively large region around the wellbore toward a relatively small area around the wellbore, the fines have a tendency to become densely packed and screen out or plug the area immediately around the wellbore. Moreover, the fines are highly abrasive and can be damaging to pumping and oilfield other equipment and operations.

Placing a relatively larger particulate near the wellbore helps filter out the sand or fine particles and prevents them from flowing into the well with the produced fluids. The primary objective is to stabilize the formation while causing minimal impairment to well productivity.

The particulate used for this purpose is referred to as "gravel." In the oil and gas field, and as used herein, the term "gravel" is refers to relatively large particles in the sand size classification, that is, particles ranging in diameter from about 0.1 mm up to about 2 mm. Generally, a particulate having the properties, including chemical stability, of a low-strength proppant is used in gravel packing. An example of a commonly used gravel packing material is sand having an appropriate particulate size range.

In one common type of gravel packing, a mechanical screen is placed in the wellbore and the surrounding annulus is packed with a particulate of a larger specific size designed to prevent the passage of formation sand or other fines. The screen holds back gravel during flow back.

In some gravel packing applications, a resinous material can be coated on the particulate. The term "coated" does not imply any particular degree of coverage on the particulates, which coverage can be partial or complete.

Frac-Packing

The combination of a hydraulically-induced fracture with a gravel-pack completion has been termed a "frac-pac." The primary purpose of a frac-pac completion is to help eliminate the high skins often associated with cased-hole gravel packs by providing a highly conductive flow path through the near-wellbore formation damaged zone.

Carrier Fluid for Particulate

A fluid can be adapted to be a carrier fluid for a particulate.

For example, a proppant used in fracturing or a gravel used in gravel packing may have a much different density than the carrier fluid. For example, sand has a specific gravity of about 2.7, whereas water has a specific gravity of 1.0 at Standard Laboratory Conditions of temperature and pressure. A proppant or gravel having a different density than water will tend to separate from water very rapidly.

Increasing Viscosity of Fluid for Suspending Particulate

Increasing the viscosity of a fluid can help prevent a particulate having a different specific gravity than a surrounding phase of the fluid from quickly separating out of the fluid.

A viscosity-increasing agent can be used to increase the ability of a fluid to suspend and carry a particulate material in a fluid. A viscosity-increasing agent can be used for other purposes, such as matrix diversion, conformance control, or friction reduction.

A viscosity-increasing agent is sometimes referred to in the art as a viscosifying agent, viscosifier, thickener, gelling agent, or suspending agent. In general, any of these refers to an agent that includes at least the characteristic of increasing the viscosity of a fluid in which it is dispersed or dissolved. There are several kinds of viscosity-increasing agents or techniques for increasing the viscosity of a fluid.

In general, because of the high volume of fracturing fluid typically used in a fracturing operation, it is desirable to efficiently increase the viscosity of fracturing fluids to the desired viscosity using as little viscosity-increasing agent as possible. In addition, relatively inexpensive materials are preferred. Being able to use only a small concentration of the viscosity-increasing agent requires a lesser concentration of the viscosity-increasing agent in order to achieve the desired fluid viscosity.

Polymers for Increasing Viscosity

Certain kinds of polymers can be used to increase the viscosity of a fluid. In general, the purpose of using a polymer is to increase the ability of the fluid to suspend and carry a particulate material. Polymers for increasing the viscosity of a fluid are preferably soluble in the external phase of a fluid. Polymers for increasing the viscosity of a fluid can be naturally occurring polymers such as polysaccharides, derivatives of naturally occurring polymers, or synthetic polymers.

Water-Soluble Polymers for Increasing Viscosity

Treatment fluids used in high volumes, such as fracturing fluids, are usually water-based. Efficient and inexpensive viscosity-increasing agents for water include certain classes of water-soluble polymers.

The water-soluble polymer can have an average molecular weight in the range of from about 50,000 Da to 20,000,000 Da, most preferably from about 100,000 Da to about 4,000,000 Da.

The viscosity-increasing agent can be provided in any form that is suitable for the particular treatment fluid or application. For example, the viscosity-increasing agent can be provided as a liquid, gel, suspension, or solid additive that is incorporated into a treatment fluid.

The viscosity-increasing agent should be present in a treatment fluid in a form and in an amount at least sufficient to impart the desired viscosity to a treatment fluid. A viscosity-increasing agent may be present in the fluids in a concentration in the range of from about 0.01% to about 5% by weight of the continuous phase therein.

Problem with Certain Hydratable Materials and Dissolved Ions

The commonly used water-soluble viscosity-increasing agents, water-soluble friction-reducing agents, and water-soluble elasticity-increasing agents are hydratable. As referred to herein, "hydratable" means capable of being hydrated by contacting the hydratable material with water. Regarding a hydratable material that includes a polymer, this means, among other things, to associate sites on the polymer with water molecules and to unravel and extend the polymer chain in the water. It is desirable for viscosity-increasing agents to be able to be hydrated directly in the water at the concentration to be used for the fluid.

A common problem with using hydratable materials is that many of the commonly-used hydratable materials used for such purposes are sensitive to dissolved ions in the water. The hydratable materials are often especially sensitive to divalent cations such as calcium and magnesium. For example, divalent cations such as calcium and magnesium can inhibit and slow the time required for hydration of certain types of polymers commonly used for such purposes.

Therefore, fracturing fluids often require the use of water that does not contain high concentrations of total dissolved solids, especially high concentrations of dissolved divalent cations. For this reason, most fracturing fluids require a minimum quality of water. Most fracturing fluids are run in potable or freshwater. However, potable water and freshwater is becoming increasingly expensive and difficult to come by, especially considering the high volumes of water required for fracturing.

To solve the problem of hydration in water having high concentrations of TDS, especially due to high concentration of divalent cations, another conventional approach has included chemically modifying the hydratable polymer so that it is better capable of hydrating in water having high TDS. Other approaches to handling water having high concentrations of TDS were by chemical addition to reduce the effect of salt. Another conventional approach has included heating a brine to about 140° F. (60° C.) to increase the hydration rate of the hydratable polymer in the brine. However, heating of brine is time consuming, expensive, and difficult to achieve in the field. Further, heating of a brine may cause the viscosity-increasing agent to build excessive viscosity if later subjected to high wellbore temperatures. It can be prohibitively expensive to heat large quantities of water.

Yet another attempted solution has been to treat the water to remove some of the interfering ions. There are several existing methods of treating non-freshwater such as evaporative distillation and reverse osmosis. Both of these treatment methods remove the vast majority of TDS from the water. Removing excess ions by distillation or reverse osmosis is an expensive process. Of course, the costs of treating water are multiplied by the large volumes of water required for well treatments, especially for the volumes of water required for water-fracturing treatments.

Water Classifications

Total dissolved solids ("TDS") refers to the sum of all minerals, metals, cations, and anions dissolved in water. As most of the dissolved solids are typically salts, the amount of salt in water is often described by the concentration of total dissolved solids in the water.

Freshwater is water containing low concentrations (typically <1%) of dissolved salts and other total dissolved solids.

Broadly speaking, "brine" is often understood to be water containing any substantial concentration of dissolved inorganic salts, regardless of the particular concentration. Therefore, "brine" may broadly refer to water containing anywhere from about 1,000 ppm to high percentages of dissolved salts. Brines used for oil field purposes sometimes contain total dissolved solids of up to about 10% or higher.

More technically, however, the terms "brackish water," "saline water," "seawater," "brine," and other terms regarding water may sometimes be used to refer to more precise ranges of concentrations of TDS.

Although the specific ranges of TDS for various types of water are not universally agreed upon, as used herein, the terms for classifying water based on concentration of TDS will generally be understood as defined in Table 1.

TABLE 1

Classification of Water Based on TDS Concentration and Relationship to Density

| Water | TDS Concentration Ranges | | Density @ 20° C. | |
| --- | --- | --- | --- | --- |
| | ppm | lb/gal (US) | g/ml | lb/gal (US) |
| Potable | <250 | <0.0021 | | |
| Freshwater | <1,000 | <0.0083 | <0.998 | <8.33 |
| Brackish | 1,000-15,000 | 0.0083-0.0417 | | |
| Saline | 15,000-30,000 | 0.0417-0.1251 | | |
| Seawater | 30,000-40,000 | 0.1251-0.3338 | 1.020-1.029 | 8.51-8.59 |
| Brine | >40,000 | >0.3338 | | |

Hardness is a more specific measure of the dissolved calcium ($Ca^{+2}$), magnesium ($Mg^{+2}$), and ferrous ($Fe^{+2}$, a form of iron) ions in water.

Water can be classified based on its source. Classifying water based on its source is independent of the classification based on a particular parameter, such as TDS.

Due to a number of factors, the range of TDS concentrations in naturally-occurring surface water, such as freshwater, brackish water, saline water, and seawater, can vary considerably within the defined ranges for the type of water. Water that is not naturally occurring can be similarly classified by the concentration of TDS, of course, which is generally with reference to the concentrations of TDS in the various types of naturally-occurring water.

Non-potable water that may be suitable for treatment fluids that include a hydratable polymer that is not sensitive to certain dissolved ions includes freshwater, brackish water, saline water, and seawater. Of course, if locally available, brackish water or seawater is relatively cheap.

The average composition of seawater, as reported by Karl K. Turekian, Oceans, 1968, Prentice-Hall, is shown in Table 3.

TABLE 3

Typical Composition of Seawater

| Dissolved Ion | Concentration mg/kg (ppm) |
| --- | --- |
| Chloride (Cl$^-$) | 19,345 |
| Sodium (Na$^+$) | 10,752 |
| Sulfate (SO$_4^{2-}$) | 2701 |
| Magnesium (Mg$^{2+}$) | 1295 |
| Calcium (Ca$^{2+}$) | 416 |
| Potassium (K$^+$) | 390 |
| Bicarbonate (HCO$_3^{2-}$) | 145 |
| Bromide (Br$^-$) | 66 |
| Borate (BO$_3^{2-}$) | 27 |
| Strontium (Sr$^{2+}$) | 13 |
| Fluoride (F$^-$) | 1 |

A synthetic seawater (ASTM.D1141) has the following composition: 19359 mg/ml chloride; 2702 mg/ml sulfate; 142 mg/ml bicarbonate; 11155 mg/ml sodium+potassium; 1297 mg/ml magnesium; 408 mg/ml calcium; TDS=35169 mg/l; pH=8.2.

It is desirable to be able to use CMHEC in a treatment fluid for fracturing or gravel packing operations with a brine. In various embodiments of the disclosed method, the aqueous phase has at least 1,000 ppm of dissolved divalent cations. The aqueous phase can have at least 25,000 ppm total dissolved inorganic salts. In various embodiments, the aqueous phase has less than 100,000 ppm total dissolved inorganic salts, and more preferably, less than 50,000 ppm total dissolved inorganic salts. Most preferably, the aqueous phase comprises seawater. In some embodiments, the aqueous phase comprises seawater without diluting the aqueous phase with any other source of water.

Selection of Carboxymethyl Hydroxyethyl Cellulose (CMHEC)

Examples of hydration of several aqueous CMHEC-based fluid wherein the CMHEC has varying degrees of CM-DS and HE-MS substitutions leads to several critical conclusion about the relationship of the chemistry of the polymer at the molecular level and its performance as a fracturing fluid as well as its salt tolerance in an ionic solution, especially a hard brine such as seawater: (A) CMHEC with carboxymethyl degree of substitution (CM-DS) between about 0.3 to about 0.45 per glucopyranose unit in polymer provides good salt tolerance even in a hard brine such as seawater and also provides good cross-linking efficiency; and (B) CMHEC with hydroxyethyl molecular substitution (HE-MS) between about 2.1 to about 2.8 per glucopyranose unit in polymer provides good salt tolerance even in a hard brine such as seawater. In addition, it is believed that random CM-DS is better than block CM substitution. The CMHEC examples were obtained from a commercial supplier, which products are conventionally used for hair conditioner or in the food industry.

In various preferred embodiments, the treatment fluid includes a CMHEC with a with CM-DS in the range of about 0.3 to about 0.45 and HE-MS in the range of about 2.8 to about 2.9.

Crosslinking of Polymer to Increase Viscosity of a Fluid or Form a Gel

The viscosity of a fluid at a given concentration of viscosity-increasing agent can be greatly increased by crosslinking the viscosity-increasing agent. A crosslinking agent, sometimes referred to as a crosslinker, can be used for this purpose. A crosslinker interacts with at least two polymer molecules to form a "crosslink" between them.

If crosslinked to a sufficient extent, the polysaccharide may form a gel with water. Gel formation is based on a number of factors including the particular polymer and concentration thereof, the particular crosslinker and concentration thereof, the degree of crosslinking, temperature, and a variety of other factors known to those of ordinary skill in the art.

The degree of crosslinking depends on the type of viscosity-increasing polymer used, the type of crosslinker, concentrations, temperature of the fluid, etc. Shear is usually required to mix the base gel and the crosslinking agent. Therefore, the actual number of crosslinks that are possible and that actually form also depends on the shear level of the system. The number of crosslinks is believed to significantly alter fluid viscosity.

For a polymeric viscosity-increasing agent, any crosslinking agent that is suitable for crosslinking the chosen monomers or polymers may be used.

Cross-linking agents typically comprise at least one metal ion that is capable of cross-linking the viscosity-increasing agent molecules.

Some crosslinking agents form substantially permanent crosslinks with viscosity-increasing polymer molecules. Such crosslinking agents include, for example, crosslinking agents of at least one metal ion that is capable of crosslinking gelling agent polymer molecules. Examples of such crosslinking agents include, but are not limited to, zirconium compounds (such as, for example, zirconium lactate, zirconium lactate triethanolamine, zirconium carbonate, zirconium acetylacetonate, zirconium maleate, zirconium citrate, zirconium oxychloride, and zirconium diisopropylamine lactate); titanium compounds (such as, for example, titanium lactate, titanium maleate, titanium citrate, titanium ammonium lactate, titanium triethanolamine, and titanium acetylacetonate); aluminum compounds (such as, for example, aluminum acetate, aluminum lactate, or aluminum citrate); antimony compounds; chromium compounds; iron compounds (such as, for example, iron chloride); copper compounds; zinc compounds; sodium aluminate; or a combination thereof.

Preferably, the source of a polyvalent metal cation is derived from a water-soluble salt of the polyvalent metal in which the metal is in the same cationic valence state as the crosslinking species. By this, it is intended to mean that the metal ion which forms the crosslinking need not be freshly formed as by a change in the valence state of the metal ion.

Where present, the cross-linking agent generally should be included in the fluids in an amount sufficient, among other things, to provide the desired degree of cross linking. In some embodiments, the cross-linking agent may be present in the treatment fluids in an amount in the range of from about 0.01% to about 5% by weight of the treatment fluid.

Buffering compounds may be used if desired, for example, to delay or control the cross linking reaction. These may include glycolic acid, carbonates, bicarbonates, acetates, phosphates, and any other suitable buffering agent.

Sometimes, however, crosslinking is undesirable, as it may cause the polymeric material to be more difficult to break and it may leave an undesirable residue in the formation.

Breaking Viscosity of a Fluid

After a treatment fluid is placed where desired in the well and for the desired time, the downhole fluid usually must then be removed from the wellbore or the formation.

For example, in the case of hydraulic fracturing, the fluid should be removed leaving the proppant in the fracture and without damaging the conductivity of the proppant bed. To accomplish this removal, the viscosity of the treatment fluid must be reduced to a very low viscosity, preferably near the viscosity of water, for optimal removal from the propped fracture. Similarly, when a viscosified fluid is used for gravel packing, the viscosified fluid must be removed from the gravel pack.

Reducing the viscosity of a viscosified treatment fluid is referred to as "breaking" the fluid. Chemicals used to reduce the viscosity of treatment fluids are called breakers.

Breakers for reducing viscosity must be selected to meet the needs of each situation. First, it is important to understand the general performance criteria for breaking. In reducing the viscosity of the treatment fluid to a near water-thin state, the breaker must maintain a critical balance. Premature reduction of viscosity during the pumping of a treatment fluid can jeopardize the treatment. Inadequate reduction of fluid viscosity after pumping can also reduce production if the required conductivity is not obtained. A breaker should be selected based on its performance in the temperature, pH, time, and desired viscosity profile for each specific treatment.

In fracturing, for example, the ideal viscosity versus time profile would be if a fluid maintained 100% viscosity until the fracture closed on proppant and then immediately broke to a thin fluid. Some breaking inherently occurs during the 0.5 to 4 hours required to pump most fracturing treatments. One guideline for selecting an acceptable breaker design is that at least 50% of the fluid viscosity should be maintained at the end of the pumping time. This guideline may be adjusted according to job time, desired fracture length, and required fluid viscosity at reservoir temperature.

A typical gravel pack break criteria is a minimum 4-hour break time, however, it is still desirable for a gravel-packing fluid to break within a few days.

No particular mechanism is necessarily implied by breaking or breaker regarding the viscosity of a fluid.

For example, for use a fluid viscosified with a polymeric material as the viscosity-increasing agent, a breaker can operate by cleaving the backbone of polymer by hydrolysis of acetyl group, cleavage of glycosidic bonds, oxidative/reductive cleavage, free radical breakage, or a combination of these processes. Accordingly, such a breaker can reduce the molecular weight of the polymer by cutting the long polymer chain. As the length of the polymer chain is cut, the viscosity of the fluid is reduced.

In another example, a breaker may reverse a crosslinking of a viscosity-increasing agent or attack the crosslinker.

Chemical Breakers

Chemical breakers used to help clean up a filtercake or break the viscosity of a viscosified fluid are generally grouped into several classes: oxidizers, enzymes, chelating agents, and acids.

Oxidizers commonly used to reduce viscosity of natural polymers includes, for example, sodium persulfate, potassium persulfate, ammonium persulfate, lithium or sodium hypochlorites, chlorites, peroxide sources (sodium perborate, sodium percarbonate, calcium percarbonate, urea-hydrogen peroxide, hydrogen peroxide, etc.), bromates, periodates, permanganates, etc. In these types of breakers, oxidation reduction chemical reactions occur as the polymer chain is broken.

Different oxidizers are selected based on their performance at different temperature and pH ranges. Consideration is also given to the rate of oxidation at a particular temperature and pH range.

Enzymes are also used to break the natural polymers in oil field applications. They are generally used at low temperature 25° C. (77° F.) to 70° C. (158° F.) as at higher temperature they denature and become ineffective. At very low temperatures, enzymes are not as effective as the rate of breakage of polymer is very slow and they are generally not recommended. Different types of enzymes are used to break different types of bond in the polysaccharides. Some enzymes break only α-glycosidic linkage and some break β-glycosidic linkage in polysaccharides. Some enzymes break polymers by hydrolysis and some by oxidative pathways. A specific enzyme is needed to break a specific polymer/polysaccharide. Enzymes are referred to as Nature's catalysts because most biological processes involve an enzyme. Enzymes are large protein molecules, and proteins consist of a chain of building blocks called amino acids. The simplest enzymes may contain fewer than 150 amino acids while typical enzymes have 400 to 500 amino acids.

Acids also provide a break via hydrolysis. Acids, however, pose various difficulties for practical applications. Acids are not used as a polysaccharide polymer breaker very often because of cost, poor break rate control, chemical compatibility difficulties, and corrosion of metal goods.

A breaker may be included in a treatment fluid in a form and concentration at selected to achieve the desired viscosity reduction at a desired time.

The breaker may be formulated to provide a delayed break, if desired. For example, a suitable breaker may be encapsulated if desired. Suitable encapsulation methods are known to those skilled in the art. One suitable encapsulation method involves coating the selected breaker in a porous material that allows for release of the breaker at a controlled rate. Another suitable encapsulation method that may be used involves coating the chosen breakers with a material that will degrade when downhole so as to release the breaker when desired. Resins that may be suitable include, but are not limited to, polymeric materials that will degrade when downhole.

A treatment fluid can optionally include an activator or a retarder to, among other things, optimize the break rate provided by a breaker. Examples of such activators include, but are not limited to, acid generating materials, chelated iron, copper, cobalt, and reducing sugars. Examples of retarders include sodium thiosulfate, methanol, and diethylenetriamine.

Delayed breakers, activators, and retarders can be used to help control the breaking of a fluid, but these may add additional complexity and cost to the design of a treatment fluid.

pH and pH Adjuster or Buffer

Preferably, the initial pH of the aqueous phase of the treatment fluid is in the range of about 5 to about 9, and more preferably in the range of about 7 to 8.5. In an embodiment including a crosslinker for the CMHEC, however, the initial pH of the aqueous phase of the treatment fluid is preferably in the range of about 5 to about 6.5.

In certain embodiments, the treatment fluids can include a pH-adjuster. Preferably, the pH adjuster does not have undesirable properties.

The pH-adjuster may be present in the treatment fluids in an amount sufficient to maintain or adjust the pH of the fluid. In some embodiments, the pH-adjuster may be present in an amount sufficient to maintain or adjust the pH of the fluid to a pH in the desired range.

In general, a pH-adjuster may function, among other things, to affect the hydrolysis rate of the viscosity-increasing agent. In some embodiments, a pH-adjuster may be included in the treatment fluid, among other things, to adjust the pH of the treatment fluid to, or maintain the pH of the treatment fluid near, a pH that balances the duration of certain properties of the treatment fluid (for example the ability to suspend particulate) with the ability of the breaker to reduce the viscosity of the treatment fluid or a pH that will result in a decrease in the viscosity of the treatment fluid such that it does not hinder production of hydrocarbons from the formation.

The pH-adjuster may be any other substance known in the art capable of maintaining the pH in a limited range. One of ordinary skill in the art, with the benefit of this disclosure, will recognize the appropriate pH-adjuster and amount thereof to use for a chosen application.

Optional Encapsulation of Solid Agents for Delayed Release

Any solid agent can be encapsulated to delay the release of the solid agent. Encapsulation techniques can be used in embodiments for controlling the delayed release of a breaker, for example.

Solid agents can be encapsulated by any suitable technique including spray coating a variety of coating materials thereon. Such coating materials include, but are not limited to, waxes, drying oils such as tung oil and linseed oil, polyurethanes and cross-linked partially hydrolyzed polyacrylics. Degradable polymers such as polyesters, poly lactic acid, and the like may also be used if desired. A solid agent also may be encapsulated in the form of an aqueous solution contained within a particulate porous solid material that remains dry and free flowing after absorbing an aqueous solution and through which the aqueous solution slowly diffuses. Examples of such particulate porous solid materials include, but are not limited to, diatomaceous earth, zeolites, silica, alumina, metal salts of alumino-silicates, clays, hydrotalcite, styrene-divinylbenzene based materials, cross-linked polyalkylacrylate esters, and cross-linked modified starches. In order to provide additional delay to the release of the solid agent encapsulated in a particulate porous solid material described above, an external coating of a polymeric material through which an aqueous solution slowly diffuses can be placed on the porous solid material. Examples of such polymeric materials include, but are not limited to, EDPM rubber, polyvinyldichloride (PVDC), nylon, waxes, polyurethanes and cross linked partially hydrolyzed acrylics.

Other Fluid Additives

A treatment fluid can contain additives that are commonly used in oil field applications, as known to those skilled in the art. These include, but are not necessarily limited to, inorganic water-soluble salts, salt substitutes (such as trimethyl or tetramethyl ammonium chloride), surfactants, defoamers, breaker aids, oxygen scavengers, alcohols, scale inhibitors, corrosion inhibitors, hydrate inhibitors, fluid-loss control additives, oxidizers, chelating agents, water-control agents (such as relative permeability modifiers), consolidating agents, proppant flowback control agents, conductivity enhancing agents, clay stabilizers, sulfide scavengers, fibers, nanoparticles, bactericides, and combinations thereof.

Of course, additives should be selected for not interfering with the purpose of the fluid.

Method of Treating a Well with the Treatment Fluid

A method of treating a well, is provided, the method including: forming a treatment fluid according to the disclosure; and introducing the treatment fluid into the well.

Designing a Fracturing Treatment for a Treatment Zone

Fracturing methods can include a step of designing or determining a fracturing treatment for a treatment zone of the subterranean formation prior to performing the fracturing stage. For example, a step of designing can include: (a) determining the design temperature and design pressure; (b) determining the total designed pumping volume of the one or more fracturing fluids to be pumped into the treatment zone at a rate and pressure above the fracture pressure of the treatment zone; (c) designing a fracturing fluid, including its composition and rheological characteristics; (d) designing the pH of the continuous phase of the fracturing fluid, if water-based; (e) determining the size of a proppant of a proppant pack previously formed or to be formed in fractures in the treatment zone; and (f) designing the loading of any proppant in the fracturing fluid.

Designing a Gravel Packing Treatment

Gravel packing methods can include a step of designing or determining a gravel packing treatment for a treatment zone of the subterranean formation. According to an embodiment, the step of designing can include: (a) determining the design temperature and design pressure; (b) determining the total designed pumping volume of the one or more treatment fluids to be pumped into the treatment zone; (c) determining the pumping time and rate; (d) designing the treatment fluid, including its composition and rheological characteristics; (e) designing the pH of the continuous phase of the treatment fluid, if water-based; (f) determining the size of a gravel; and (g) designing the loading of the gravel in the fluid.

Forming Treatment Fluid

A treatment fluid can be prepared at the job site, prepared at a plant or facility prior to use, or certain components of the fluid can be pre-mixed prior to use and then transported to the job site. Certain components of the fluid may be provided as a "dry mix" to be combined with fluid or other components prior to or during introducing the fluid into the well.

In certain embodiments, the preparation of a treatment fluid can be done at the job site in a method characterized as being performed "on the fly." The term "on-the-fly" is used herein to include methods of combining two or more components wherein a flowing stream of one element is continuously introduced into flowing stream of another component so that the streams are combined and mixed while continuing to flow as a single stream as part of the on-going treatment. Such mixing can also be described as "real-time" mixing.

Introducing the Treatment Fluid into the Treatment Zone

Often the step of delivering a fluid into a well is within a relatively short period after forming the fluid, for example, less within 30 minutes to one hour. More preferably, the step of delivering the fluid is immediately after the step of forming the fluid, which is "on the fly."

It should be understood that the step of delivering a fluid into a well can advantageously include the use of one or more fluid pumps.

Introducing Below or Above Fracture Pressure

In an embodiment, the step of introducing is at a rate and pressure below the fracture pressure of the treatment zone. This can be useful, for example, in a gravel-packing step.

In an embodiment, the step of introducing comprises introducing under conditions for fracturing a treatment zone. The fluid is introduced into the treatment zone at a rate and pressure that are at least sufficient to fracture the zone.

Performing a Fracturing Stage

In general, a fracturing treatment preferably includes pumping the one or more fracturing fluids into a treatment zone at a rate and pressure above the fracture pressure of the treatment zone.

Monitoring for Fracturing

Any of the fracturing methods can include a step of monitoring to help determine the end of a fracturing stage. The end of a fracturing stage is the end of pumping into a treatment zone, which can be due to screenout at or near the wellbore or other mechanical or chemical diversion of fluid to a different treatment zone.

One technique for monitoring is measuring the pressure in the wellbore along the treatment zone. Another technique includes a step of determining microseismic activity near the zone to confirm an increase in fracture complexity in the treatment zone.

Gravel Packing

In an embodiment, the step of introducing comprises introducing under conditions for gravel packing the treatment zone.

The combination of a hydraulically-induced fracture with a gravel-pack completion has been termed a "frac-pac." The primary purpose of a frac-pac completion is to help eliminate the high skins often associated with cased-hole gravel packs by providing a highly conductive flow path through the near-wellbore formation damaged zone.

Allowing Time for Breaking in the Well

After the step of introducing the treatment fluid, in an embodiment the method includes the step of allowing time for breaking the viscosity of the fluid in the well. This can be accomplished, for example, by shutting in the treatment zone before flowing back fluid from the well. The breaking of the viscosity of the treatment fluid preferably occurs with time under the conditions in the zone of the subterranean fluid.

In various embodiments, the treatment fluid is adapted to break at the design temperature within about 5 days. More preferably, the treatment fluid is adapted to break within 24 hours. Most preferably, the treatment fluid is adapted to break in less than 4 hours at the design temperature for the treatment.

Flow Back Conditions

In various embodiments, a step of flowing back from the treatment zone is within about 5 days of the step of introducing. In another embodiment, the step of flowing back is within about 24 hours of the step of introducing. In some embodiments, the step of flowing back is within about 4 hours of the step of introducing.

Producing Hydrocarbon from Subterranean Formation

Preferably, after any such use of a fluid according to the disclosure, a step of producing hydrocarbon from the well or a particular zone is the desirable objective.

CONCLUSION

Therefore, the present disclosure is well adapted to attain the ends and advantages mentioned as well as those that are inherent therein.

The exemplary fluids disclosed herein may directly or indirectly affect one or more components or pieces of equipment associated with the preparation, delivery, recapture, recycling, reuse, or disposal of the disclosed fluids. For example, the disclosed fluids may directly or indirectly affect one or more mixers, related mixing equipment, mud pits, storage facilities or units, fluid separators, heat exchangers, sensors, gauges, pumps, compressors, and the like used generate, store, monitor, regulate, or recondition the exemplary fluids. The disclosed fluids may also directly or indirectly affect any transport or delivery equipment used to convey the fluids to a well site or downhole such as, for example, any transport vessels, conduits, pipelines, trucks, tubulars, or pipes used to fluidically move the fluids from one location to another, any pumps, compressors, or motors (for example, topside or downhole) used to drive the fluids into motion, any valves or related joints used to regulate the pressure or flow rate of the fluids, and any sensors (i.e., pressure and temperature), gauges, or combinations thereof, and the like. The disclosed fluids may also directly or indirectly affect the various downhole equipment and tools that may come into contact with the chemicals/fluids such as, but not limited to, drill string, coiled tubing, drill pipe, drill collars, mud motors, downhole motors or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

The particular embodiments disclosed above are illustrative only, as the present disclosure may be modified and practiced in different but equivalent manners apparent to those skilled in the art having the benefit of the teachings herein. It is, therefore, evident that the particular illustrative embodiments disclosed above may be altered or modified and all such variations are considered within the scope of the present disclosure.

The various elements or steps according to the disclosed elements or steps can be combined advantageously or practiced together in various combinations or sub-combinations of elements or sequences of steps to increase the efficiency and benefits that can be obtained from the disclosure.

It will be appreciated that one or more of the above embodiments may be combined with one or more of the other embodiments, unless explicitly stated otherwise.

This illustrative disclosure can be practiced in the absence of any element or step that is not specifically disclosed or claimed.

Furthermore, no limitations are intended to the details of composition, design, or steps herein shown, other than as described in the claims.

What is claimed is:

1. A method of treating a treatment zone of a subterranean formation penetrated by a wellbore of a well, the method comprising:
    (A) forming a treatment fluid comprising:
        (i) an aqueous phase comprising water having at least 1,000 ppm total dissolved inorganic salts;
        (ii) a carboxymethyl hydroxyethyl cellulose, wherein:
            (a) the carboxymethyl hydroxyethyl cellulose has a carboxymethyl degree of substitution is in the range of about 0.3 to about 0.45 per glucopyranose unit in the polymer; and
            (b) the carboxymethyl hydroxyethyl cellulose has a hydroxyethyl molecular substitution is in the range of about 2.1 to about 2.8 per glucopyranose unit in the polymer;
        (iii) a crosslinker for the carboxymethyl hydroxyethyl cellulose, wherein the crosslinker comprises a polyvalent cation; and
        (iv) a breaker for the carboxymethyl hydroxyethyl cellulose;
        wherein the aqueous phase has or is adjusted to have an initial pH in the range of 4.5-6.5; and
    (B) introducing the treatment fluid into the treatment zone.

2. The method according to claim 1, wherein the aqueous phase has at least 1,000 ppm of dissolved divalent cations.

3. The method according to claim 2, wherein the aqueous phase has at least 25,000 ppm total dissolved inorganic salts.

4. The method according to claim 1, wherein the treatment fluid is water-based.

5. The method according to claim 1, wherein the breaker is selected from the group consisting of an oxidizer, an enzyme, or an acid.

6. The method according to claim 5, wherein the breaker comprises a delayed release breaker.

7. The method according to claim 5, wherein the breaker is encapsulated.

8. The method according to claim 1, wherein the treatment fluid is aged less than 24 hours prior to introducing into the treatment zone.

9. The method according to claim 1, wherein the treatment fluid additionally comprises a particulate selected from the group consisting of: proppant and gravel.

10. The method according to claim 1, wherein the well is a production well.

* * * * *